(12) United States Patent  
Maeda et al.

(10) Patent No.: US 10,227,029 B2  
(45) Date of Patent: Mar. 12, 2019

(54) CONTAINER HOLDER ATTACHED TO UTILITY VEHICLE

(71) Applicant: KAWASAKI JUKOGYO KABUSHIKI KAISHA, Hyogo (JP)

(72) Inventors: Kazuhiro Maeda, Akashi (JP); Itsuo Takegami, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 706 days.

(21) Appl. No.: 14/821,035

(22) Filed: Aug. 7, 2015

(65) Prior Publication Data

US 2017/0036585 A1 Feb. 9, 2017

(51) Int. Cl.
*B60N 3/10* (2006.01)

(52) U.S. Cl.
CPC .............. *B60N 3/103* (2013.01); *B60N 3/102* (2013.01)

(58) Field of Classification Search
CPC ................................ B60N 3/103; B60N 3/102
USPC ......... 224/539; 280/756; 296/37.1; 220/737; 248/311.2
See application file for complete search history.

(56) References Cited

U.S. PATENT DOCUMENTS

| | | | | |
|---|---|---|---|---|
| 2,888,795 A * | 6/1959 | Lundell | ............... | A01D 43/081 56/320.2 |
| 3,391,891 A * | 7/1968 | Garden | .................. | B60N 3/102 108/135 |
| 3,712,235 A * | 1/1973 | Russ | ....................... | B60N 3/103 108/46 |
| 4,887,784 A * | 12/1989 | Kayali | .................... | B60N 3/102 248/231.51 |
| 4,984,722 A * | 1/1991 | Moore | .................... | B60N 3/102 224/549 |
| 5,014,956 A * | 5/1991 | Kayali | .................... | B60N 3/102 248/311.2 |
| 5,072,909 A * | 12/1991 | Huang | .................... | B60N 3/102 248/215 |
| 5,106,046 A * | 4/1992 | Rowles | .................. | B60N 3/103 248/214 |

(Continued)

FOREIGN PATENT DOCUMENTS

FR 2888795 A1 * 1/2007 ............. B60N 3/102

*Primary Examiner* — Nathan J Newhouse
*Assistant Examiner* — Lester L Vanterpool
(74) *Attorney, Agent, or Firm* — Wenderoth, Lind & Ponack, L.L.P.

(57) ABSTRACT

A container holder attached to a utility vehicle and including a support member; an upper holding member attached to the support member and holding a side surface of a container; and a lower holding member attached to the support member and supporting a lower surface of a container; wherein the upper holding member is rotatable with respect to the support member between a first holding position of holding a container and a first accommodated position of holding no container, the lower holding member is rotatable with respect to the support member between a second holding position of holding a container and a second accommodated position of holding no container, the upper holding member located at the first accommodated position holds the lower holding member located at the second accommodated position, and the support member includes a fixing portion configured to fix the upper holding member at the first accommodated position.

5 Claims, 10 Drawing Sheets

(56) References Cited

U.S. PATENT DOCUMENTS

| | | | | |
|---|---|---|---|---|
| 5,219,140 A * | 6/1993 | Spykerman | ............ | B60N 3/103 220/738 |
| 5,280,870 A * | 1/1994 | Chick | .................... | B60N 3/102 211/88.01 |
| 5,489,055 A * | 2/1996 | Levy | ...................... | B60N 3/103 224/544 |
| 5,573,214 A * | 11/1996 | Jones | ...................... | B60N 3/103 248/205.5 |
| 5,603,477 A * | 2/1997 | Deutsch | ................. | B60N 3/102 248/292.12 |
| 5,833,194 A * | 11/1998 | Jones | ...................... | B60N 3/103 248/311.2 |
| 6,098,860 A * | 8/2000 | Phillips | .................. | B60N 3/103 224/482 |
| 6,715,726 B1 * | 4/2004 | Dybalski | ................ | B60N 3/102 224/926 |
| 7,413,244 B2 * | 8/2008 | Tanaka | ................... | B60N 3/108 224/274 |
| 7,967,100 B2 | 6/2011 | Cover et al. | | |
| 8,033,518 B2 * | 10/2011 | Schuchman | ........... | B60N 3/103 224/679 |
| 8,091,749 B2 * | 1/2012 | Stautzenberger, Sr. | ... | B60R 9/00 224/274 |
| 9,266,456 B2 * | 2/2016 | Zhang | .................... | B60N 3/106 |
| 2008/0169667 A1 * | 7/2008 | Siniarski | ................ | B60N 3/002 296/37.8 |
| 2010/0093696 A1 * | 4/2010 | Bennett | ................ | C07D 487/04 514/210.21 |

\* cited by examiner

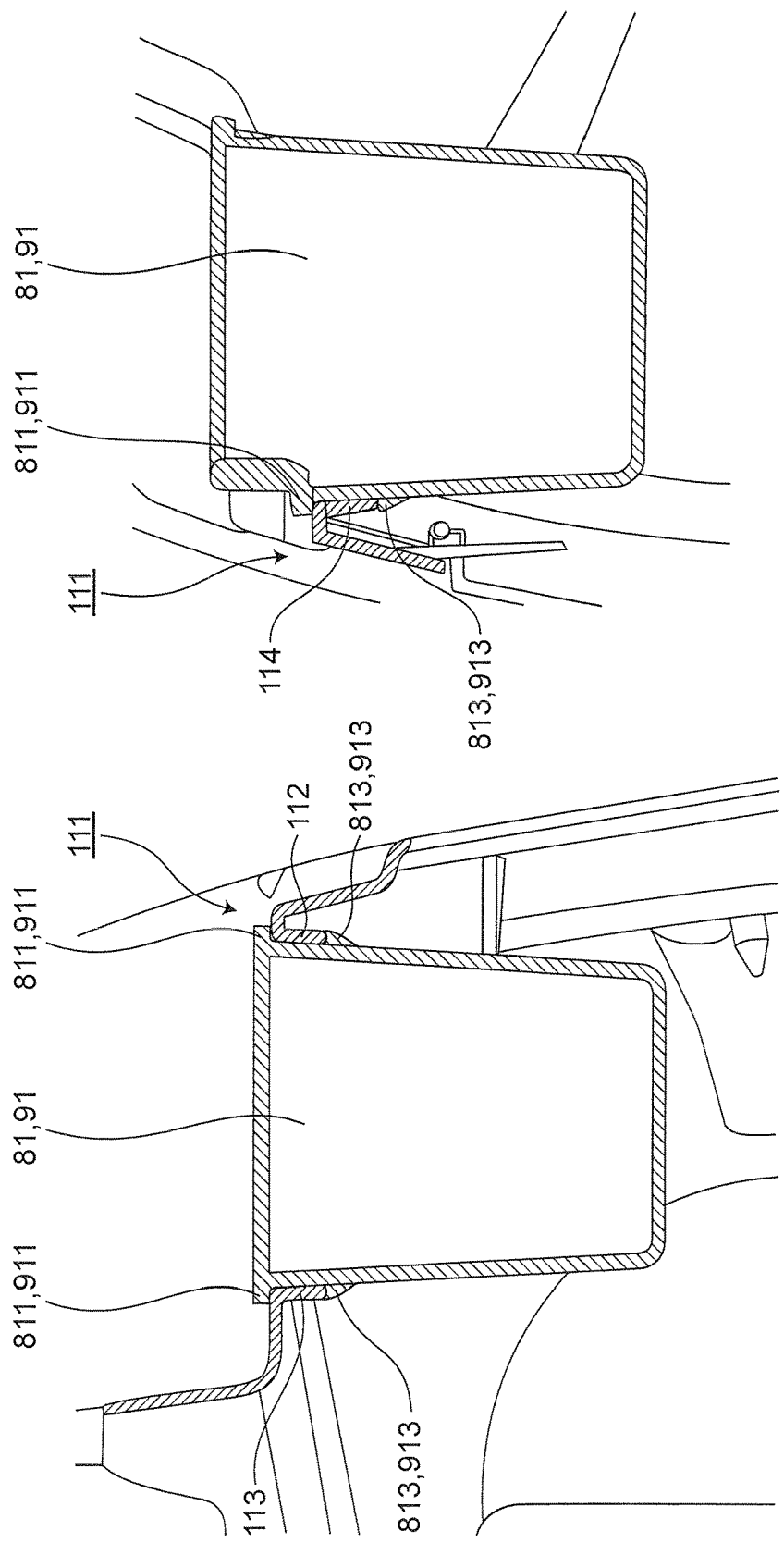

CONTAINER HOLDER ATTACHED TO UTILITY VEHICLE

BACKGROUND OF THE INVENTION

1. Field of the Invention

The present invention relates to a container holder attached to a utility vehicle.

2. Description of the Related Art

There has been conventionally disclosed a utility vehicle that is provided with a container holder configured to hold a drink container near a driver's seat. U.S. Pat. No. 7,967,100 discloses a utility vehicle including front seats and a rear seat. This utility vehicle is provided, at a rear portion of a console box disposed between the front seats, with a container holder for a crew seated at the rear seat.

SUMMARY OF THE INVENTION

The container holder for a crew seated at the rear seat, which is provided at the rear portion of the console box disposed between the front seats, is inconvenient for the crew seated at the rear seat because it is not easy for the crew to pick up a container received in the container holder.

In view of the above, an object of the present invention is to provide a container holder that allows a crew seated at a seat to easily pick up a container received in the container holder.

In order to achieve the object mentioned above, according to a first aspect of the present invention, there is provided a container holder attached to a utility vehicle, the container holder configured to be attached to a R.O.P.S. of the utility vehicle, the container holder including:

a support member held by the R.O.P.S.;

an upper holding member attached to the support member and configured to hold a side surface of a container; and a lower holding member attached to the support member and configured to support a lower surface of a container; wherein the upper holding member is rotatable with respect to the support member to be displaceable between a first holding position of holding a container and a first accommodated position of holding no container, the lower holding member is rotatable with respect to the support member to be displaceable between a second holding position of holding a container and a second accommodated position of holding no container, the upper holding member located at the first accommodated position holds the lower holding member located at the second accommodated position, and the support member includes a fixing portion configured to fix the upper holding member at the first accommodated position.

The container holder is attached to the R.O.P.S. in this configuration. A crew seated at a seat can thus easily pick up a container received in the container holder. The container holder is also displaceable between the holding position of holding a container and the accommodated position of holding no container. Furthermore, the upper holding member is fixed at the first accommodated position to hold the lower holding member at the second accommodated position. The container holder can thus be easily located at the accommodated position.

The container holder according to the first aspect of the present invention preferably includes any of the following configurations.

(1) The support member is provided between two members in the R.O.P.S. located vertically and extending in a vehicle width direction and is adjustable in vertical length to be held by the two members in the R.O.P.S.

(2) In the configuration (1), the utility vehicle has a riding space accommodating a front seat and a rear seat, the R.O.P.S. includes a grip member configured to be gripped by a crew seated at the rear seat and a backrest member configured to support a backrest for the front seat, and the support member is held by the grip member and the backrest member.

(3) The container holder further includes a cup having an upper edge held by the upper holding member and a lower surface supported by the lower holding member, and the cup has a projection located below the upper edge and projecting outward from a side surface of the cup.

(4) In the configuration (3), the utility vehicle has a riding space accommodating a front seat and a rear seat, and a cup holder for a crew seated at the front seat, the cup holder being disposed ahead of the front seat, and the cup holder has an engagement portion engaged with the cup between the upper edge and the projection to allow the cup to be attached to the cup holder.

The container holder can be held by the R.O.P.S. in the configuration (1). Accordingly, there is no need to provide any additional holding portion for the container holder.

The configuration (2) specifies the R.O.P.S. holding the support member, and particularly allows a crew seated at the rear seat to easily pick up a container received in the container holder.

In the configuration (3), the cup is provided to receive a drink container. The cup has the projection that prevents the cup from jumping upward from the upper holding member.

In the configuration (4), the cup in the container holder is applicable to the cup holder for a crew seated at the front seat.

According to a second aspect of the present invention, there is provided a container holder attached to a utility vehicle, the container holder configured to be attached to a door of the utility vehicle, the container holder including:

an upper holding portion configured to hold a side surface of a container and a lower holding portion configured to support a lower surface of a container; wherein the upper holding portion includes a first extending portion extending in a vehicle width direction toward the door and a first tip end portion extending upward from an end of the first extending portion, the lower holding portion includes a second extending portion extending in the vehicle width direction toward the door and a second tip end portion extending upward from an end of the second extending portion, and the door has a first insertion hole configured to receive the first tip end portion and a second insertion hole configured to receive the second tip end portion.

The container holder is attached to the door in this configuration. A crew seated at a seat can thus easily pick up a container received in the container holder. Furthermore, this configuration achieves the container holder that is easily attached to the door of the utility vehicle.

Further, the container holder according to the second aspect of the present invention preferably includes any of the following configurations.

(1) The container holder further includes an elastic member attached to the first extending portion and being in contact with a side surface of a container received in the container holder.

(2) In the configuration (1), the elastic member is provided with a cut off portion, and the cut off portion is engaged with the first extending portion.

(3) In the configuration (2), the cut off portion is provided in a lower surface of the elastic member.

(4) The first insertion hole has a first opening extending in an anteroposterior direction, a second opening extending upward from a front end of the first opening, and a third opening extending upward from a rear end of the first opening, the second insertion hole has a fourth opening extending in the anteroposterior direction and a fifth opening extending upward from an anteroposterior center of the fourth opening, the second opening and the third opening are shorter in vertical length than the first tip end portion, the second tip end portion has first and second projections paired in the anteroposterior direction, the fifth opening is longer in vertical length than the second tip end portion, the second tip end portion is configured to be contractable in anteroposterior distance between the first projection and the second projection to pass through the fifth opening, the anteroposterior distance between the first projection and the second projection returns to a length before shrinkage after the second tip end portion passes through the fifth opening, and the first projection is located at a front end of the fourth opening and the second projection is located at a rear end of the fourth opening.

(5) The first insertion hole and the second insertion hole are provided in a flat part in an inner surface of the door.

In the configuration (1), the elastic member improves the container holding property of the container holder.

In the configuration (2), the elastic member is easily attached to the first extending portion.

In the configuration (3), the elastic member is easily attached from above the first extending portion.

The configuration (4) achieves the container holder that is easily attached to the door of the utility vehicle and is less likely to be disengaged from the door while the container holder is attached.

The configuration (5) achieves easy provision of the first insertion hole and the second insertion hole. The configuration (5) also prevents interference between the door and a container received in the container holder that is attached to the door.

The present invention thus provides the container holder that allows a crew seated at a seat to easily pick up a container received in the container holder.

BRIEF DESCRIPTION OF THE DRAWINGS

FIG. 11 is a sectional view taken along line XI-XI indicated in FIG. 10; and FIG. 12 is a sectional view taken along line XII-XII indicated in FIG. 10.

DETAILED DESCRIPTION OF THE INVENTION

[Entire Structure of Vehicle]

Figure 1:
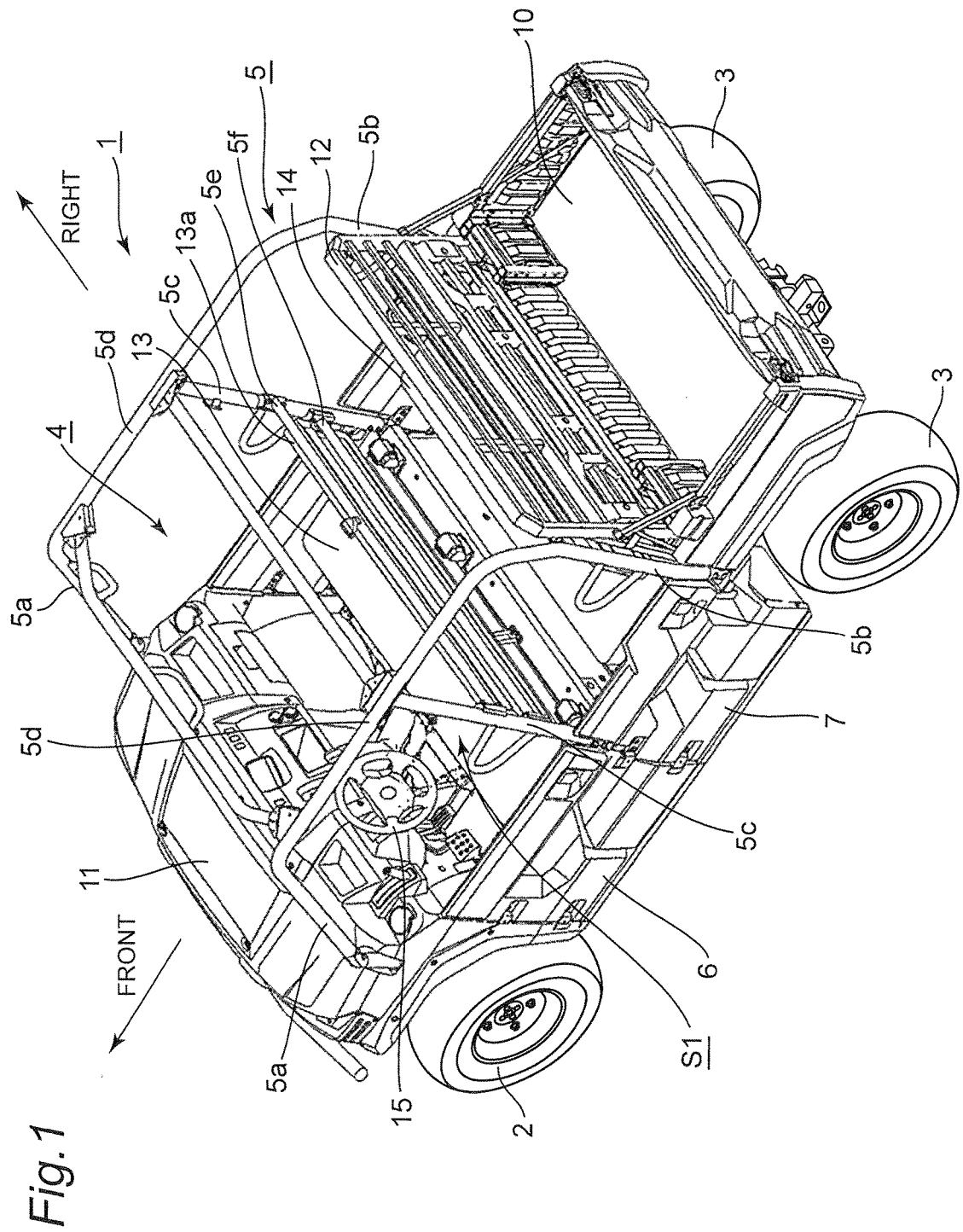
FIG. 1 is a perspective view of a utility vehicle including a container holder according to an embodiment of the present invention.

FIG. 1 is a perspective view of a utility vehicle including a container holder according to an embodiment of the present invention. The utility vehicle mainly travels on grass fields, gravel ground, and sandy soil, as well as on wild lands such as unpaved mountain baths or forest roads, muddy places, and craggy places. Assume that the concept of directions according to the present embodiment matches the concept of directions viewed from a driver of the utility vehicle.

As shown in FIG. 1, a utility vehicle 1 includes a pair of right and left front wheels 2 at a front portion of a vehicle body, a pair of right and left rear wheels 3 at a rear portion of the vehicle body, and a riding space (cabin) 4 between the front wheels 2 and the rear wheels 3. The riding space 4 is surrounded with a R.O.P.S. 5, a pair of right and left front doors 6, and a pair of right and left rear doors 7. The R.O.P.S. is an abbreviation for a rollover protective structure. The R.O.P.S. 5 configures part of a vehicle body frame, and includes a pair of right and left front vertical members 5a, a pair of right and left rear vertical members 5b, a pair of right and left intermediate vertical members 5c provided between the front vertical members 5a and the rear vertical members 5b, and a plurality of upper end beam members 5d coupling the upper ends of the vertical members 5a, 5b, and 5c. The R.O.P.S. 5 further includes an upper lateral member 5e and a lower lateral member 5f that extend in the vehicle width direction (transversely) and couple the pair of right and left intermediate vertical members 5c. The upper lateral member 5e and the lower lateral member 5f are located vertically and extend in the vehicle width direction. The riding space 4 is provided therebehind with a cargo bed 10, and is provided thereahead with a bonnet 11. The cargo bed 10 is provided, at the front end, with a screen 12 that partitions between the riding space 4 and the cargo bed 10. The front half of the riding space 4 is provided with a bench type front seat 13 and the rear half of the riding space 4 is provided with a bench type rear seat 14. The front seat 13 has a left seating area S1 serving as a driver's seat. The left seating area S1 is provided thereahead with an operation unit including a steering wheel 15 and the like.

The upper lateral member 5e included in the R.O.P.S. 5 is utilized as a grip member configured to be gripped by a crew seated at the rear seat 14. The lower lateral member 5f is utilized as a backrest member configured to support a backrest 13a for the front seat 13.

Figure 2:
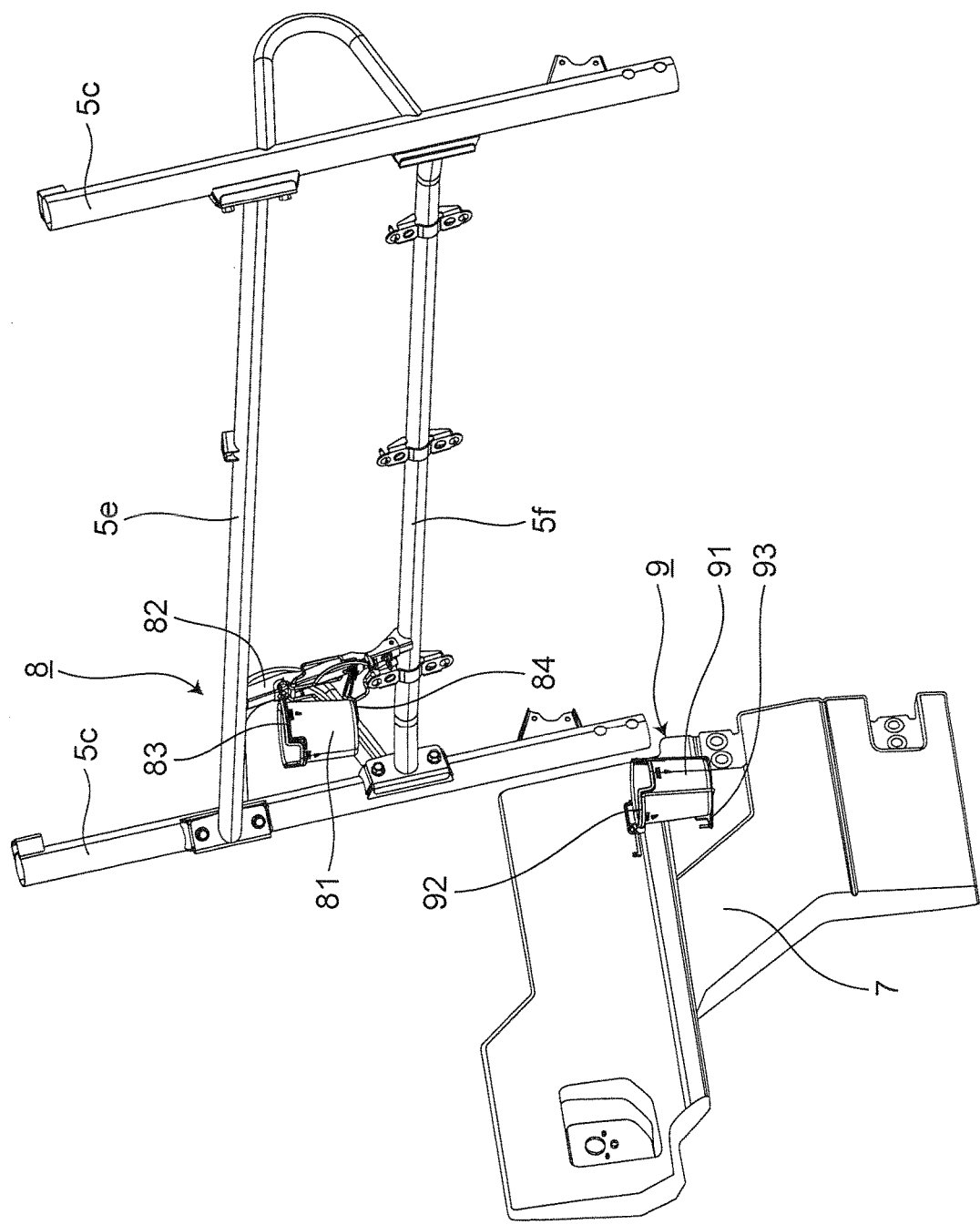
FIG. 2 is an enlarged view of an upper lateral member, a lower lateral member, and a left rear door shown in FIG. 1.

FIG. 2 is an enlarged view of the upper lateral member 5e, the lower lateral member 5f, and a left rear door portion 7a shown in FIG. 1. As shown in FIG. 2, a rear seat container holder 8 for a crew seated at the rear seat 14 is attached to the upper lateral member 5e and the lower lateral member 5f, and an inside door container holder 9 for a crew seated at the rear seat 14 is attached to an inner wall of the left rear door portion 7a.

[Rear Seat Container Holder]

Figure 3:
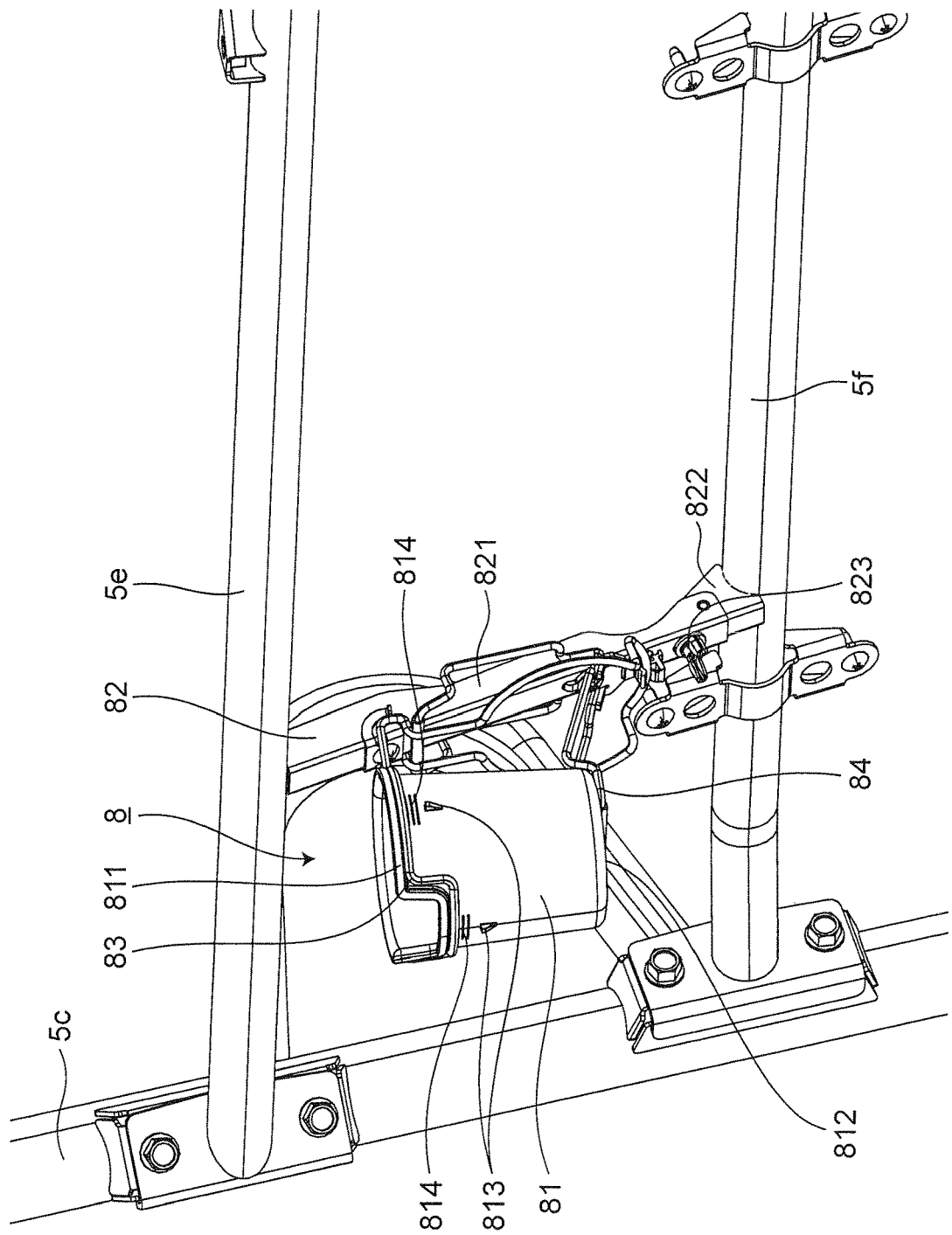
FIG. 3 is an enlarged view of a rear seat container holder shown in FIG. 2.

FIG. 3 is an enlarged view of the rear seat container holder 8 shown in FIG. 2. As shown in FIGS. 2 and 3, the container holder 8 includes a cup 81, a support member 82 held by the upper lateral member 5e and the lower lateral member 5f, an upper holding member 83 attached to the support member 82 and configured to hold the side surface of the cup 81, and a lower holding member 84 attached to the support member 82 and configured to support the lower surface of the cup 81.

The cup 81 has an upper edge 811 held by the upper holding member 83 and a lower surface 812 supported by the lower holding member 84. The upper edge 811 is partially provided with a circumferential recess part recessed downward. The upper holding member 83 is accordingly circumferentially recessed in correspondence with the recess part of the upper edge 811. The upper edge 811 projects radially outward from the side surface of the cup 81 so as to be placed on the upper holding member 83. The cup 81 has projections 813 located below the upper edge 811 and projecting radially outward from the side surface of the cup 81. There is circumferentially provided a plurality of projections 813 on the side surface of the cup 81. As exemplified in FIG. 3, the projections 813 are provided on the side surface at a right position and/or a left position, and at a rear position in a state where the cup 81 is held. The cup 81 is provided, between the upper edge 811 and the projections 813, with a projecting thread portion 814 that projects radially outward from the side surface of the cup 81 and circumferentially extends to have a predetermined length. The projecting thread portion 814 has a plurality of projecting threads. FIG. 3 exemplifies a case where the projecting thread portion 814 has about three projecting threads. The projecting thread portion 814 from the side surface of the cup 81 is smaller in projecting amount than the projections 813.

The support member 82 includes a body 821 and a length adjusting portion 822. The length adjusting portion 822 is attached to the body 821 by a screw 823, and is vertically slidable with respect to the body 821 when the screw 823 is unfastened. When the support member 82 is disposed between the upper lateral member 5e and the lower lateral member 5f and the screw 823 is unfastened to slide the length adjusting portion 822 with respect to the body 821 so that the total length of the body 821 and the length adjusting portion 822 becomes substantially equal to the distance between the upper lateral member 5e and the lower lateral member 5f, the support member 82 is tightly located between the upper lateral member 5e and the lower lateral member 5f to be held by the upper lateral member 5e and the lower lateral member 5f.

Figure 4:
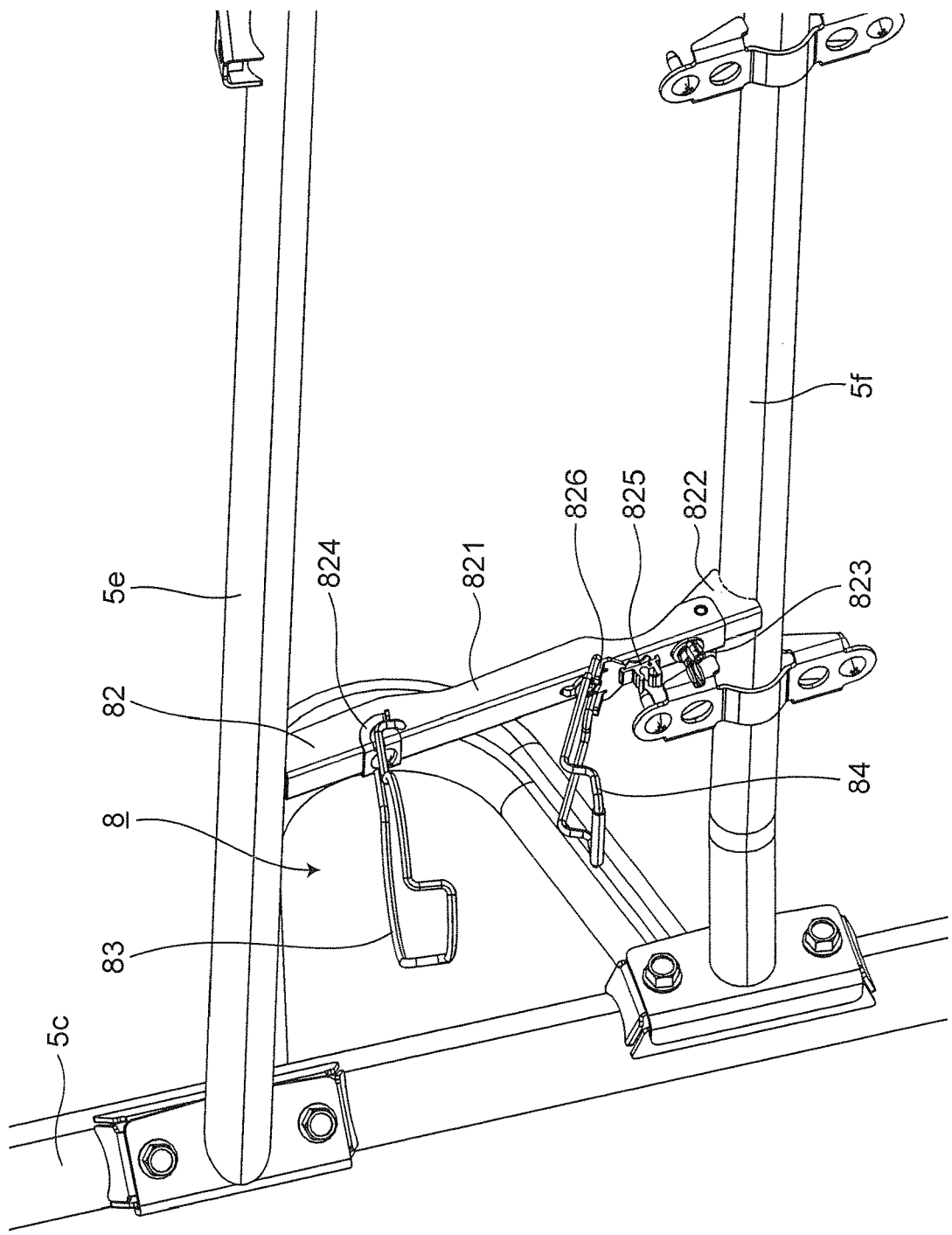
FIG. 4 is a view of a state where the container holder is located at a first holding position and a second holding position of holding a cup while a cup is removed.
Figure 5:
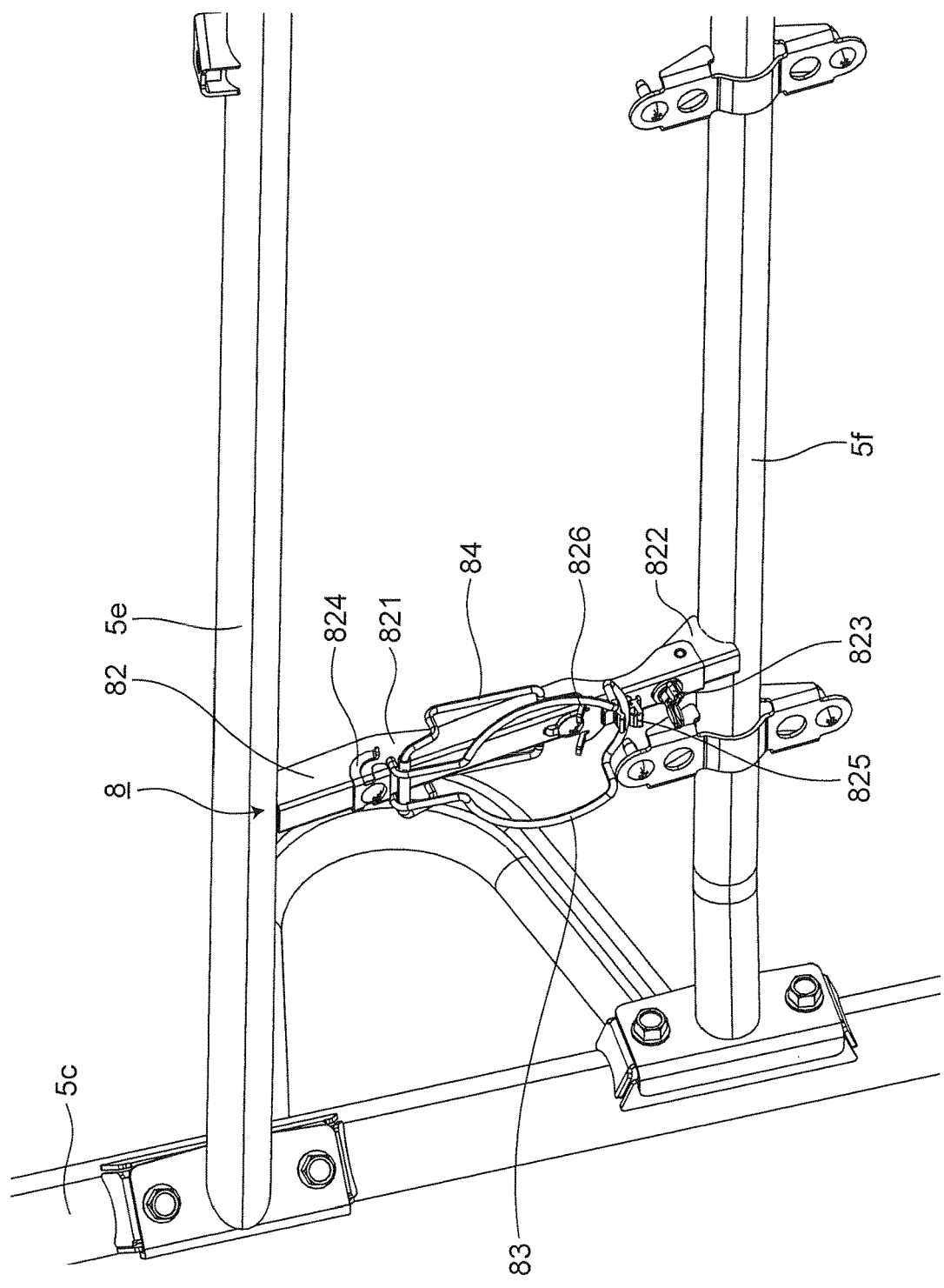
FIG. 5 is a view of a state where the container holder is located at a first accommodated position and a second accommodated position of holding no cup.

FIG. 4 is a view of a state where the container holder 8 is located at a first holding position and a second holding position of holding the cup 81 while the cup 81 is removed. FIG. 5 is a view of a state where the container holder 8 is located at a first accommodated position and a second accommodated position of not holding the cup 81. As shown in FIGS. 4 and 5, the upper holding member 83 is vertically rotatably attached to the support member 82 so as to be displaceable between the first holding position of holding the cup 81 and the first accommodated position of not holding the cup 81. There is provided a locking member 824 attached to the support member 82. The upper holding member 83 located at the first holding position is in contact with the locking member 824, and the upper holding member 83 is thus locked so as not to rotate upward beyond the first holding position. A fixing member 825 is further attached to the support member 82. When the upper holding member 83 rotates downward and is located at the first accommodated position, the upper holding member 83 is engaged with the fixing member 825 and is fixed at the first accommodated position.

The lower holding member 84 is vertically rotatably attached to the support member 82 so as to be displaceable between the second holding position of holding the cup 81 and the second accommodated position of not holding the cup 81. There is provided a locking member 826 attached to the support member 82. The lower holding member 84 located at the second holding position is in contact with the locking member 826, and the lower holding member 84 is thus locked so as not to rotate downward beyond the second holding position. When the lower holding member 84 is rotated upward to come into contact with the support member 82 and reach the second accommodated position and then the upper holding member 83 is rotated downward to become engaged with the fixing member 825 and be fixed at the first accommodated position, the upper holding member 83 at the first accommodated position holds the lower holding member 84 at the second accommodated position. The lower holding member 84 at the second accommodated position is thus prevented from rotating downward.

The container holder 8 thus configured can achieve the following effects.

(1) The container holder 8 is attached to the R.O.P.S. 5, so that a crew seated at a seat can easily pick up a container received in the container holder 8.

(2) The container holder 8 is displaceable between the holding position of holding a container and the accommodated position of holding no container. The present invention thus provides the container holder 8 that is displaceable between the holding position and the accommodated position. Furthermore, the upper holding member 83 is fixed at the first accommodated position to hold the lower holding member 84 at the second accommodated position. The container holder 8 can thus be easily located at the accommodated position.

(3) The support member 82 is adjustable in vertical length so as to be provided and held between the two members in the R.O.P.S. 5 located vertically and extending in the vehicle width direction. The container holder 8 can be held by the R.O.P.S. 5. Accordingly, there is no need to provide any additional holding portion for the container holder 8.

(4) The support member 82 is held by the grip member 5e and the backrest member 51, and allows a crew seated at the rear seat 14 to easily pick up a container received in the container holder 8.

(5) The container holder 8 includes the cup 81, so that a drink container can be received in the cup 81. The cup 81 has the projections 813 that prevent the cup 81 from jumping upward from the upper holding member 83.

[Inside Door Container Holder]

Figure 6:
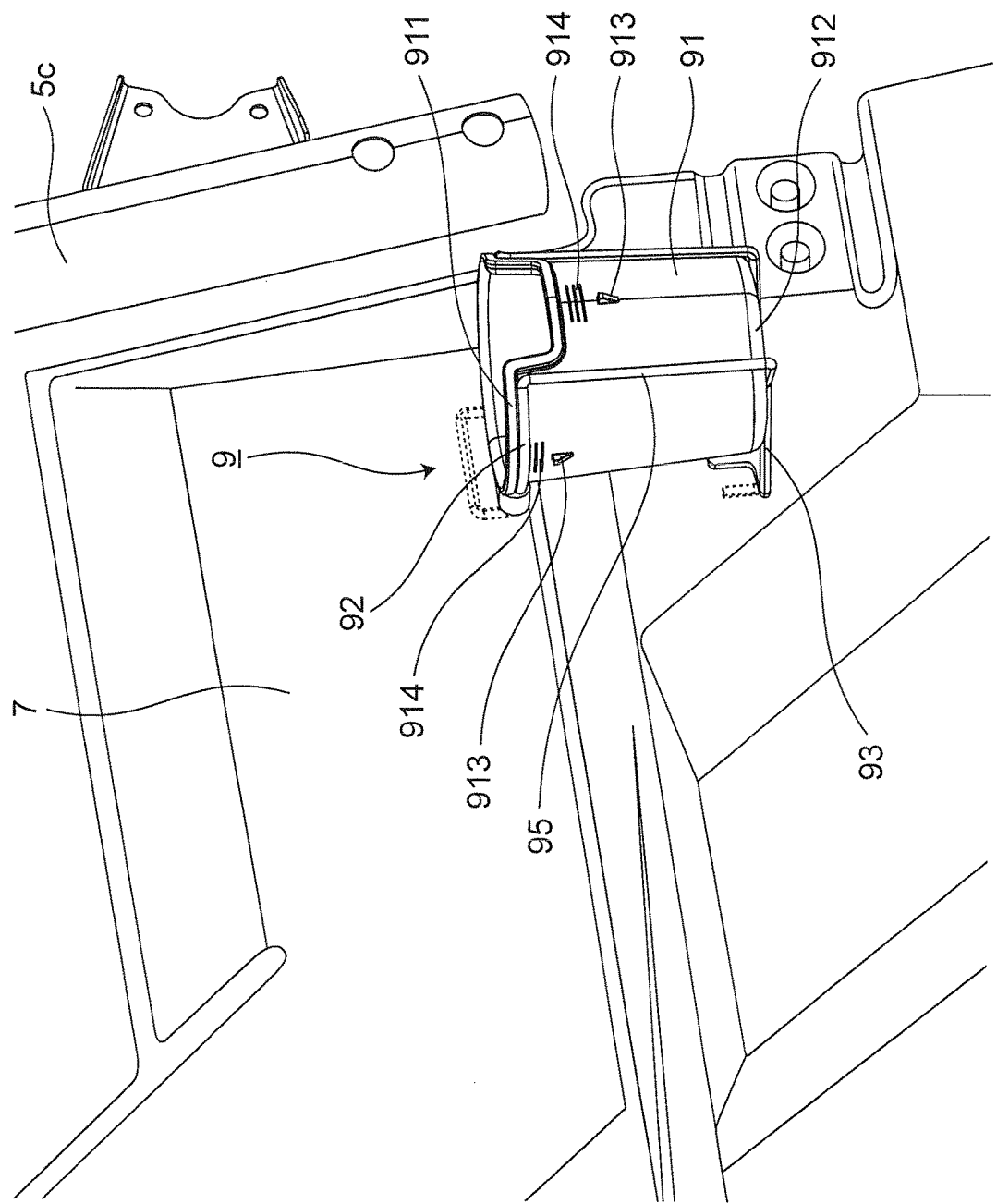
FIG. 6 is an enlarged view of an inside door container holder shown in FIG. 2.

FIG. 6 is an enlarged view of the inside door container holder 9 shown in FIG. 2. The container holder 9 is applicable not only to the left rear door 7, but is applicable to any one of the pair of right and left front doors 6 and the pair of right and left rear doors 7. The container holder 9 attached to the left rear door 7 is exemplified in the following description.

As shown in FIGS. 2 and 6, the container holder 9 is configured to be attached to the inner wall surface of the left rear door 7. The container holder 9 includes a cup 91, an upper holding portion 92 configured to hold the side surface of the cup 91, and a lower holding portion 93 configured to support the lower surface of the cup 91. The upper holding portion 92 and the lower holding portion 93 are coupled by a vertical holding portion 95, so that the upper holding portion 92, the lower holding portion 93, and the vertical holding portion 95 are provided integrally.

The cup 91 is shaped similarly to the cup 81, and has an upper edge 911 held by the upper holding portion 92 and a lower surface 912 supported by the lower holding portion 93. The upper edge 911 is partially provided with a circumferential recess part recessed downward. The upper holding portion 92 is accordingly circumferentially recessed in correspondence with the recess part of the upper edge 911. The upper edge 911 projects radially outward from the side surface of the cup 91 so as to be placed on the upper holding portion 92. The cup 91 has projections 913 located below the upper edge 911 and projecting radially outward from the side surface of the cup 91. There is circumferentially provided a plurality of projections 913 on the side surface of the cup 91. As exemplified in FIG. 6, the projections 913 are provided on the side surface at a front position and/or a rear position, and at a right position in a state where the cup 91 is held. The cup 91 is provided, between the upper edge 911 and the projections 913, with a projecting thread portion 914 that projects radially outward from the side surface of the cup 91 and circumferentially extends to have a predetermined length. The projecting thread portion 914 has a plurality of projecting threads. FIG. 6 exemplifies a case where the projecting thread portion 914 has about three projecting threads. The projecting thread portion 914 from the side surface of the cup 91 is smaller in projecting amount than the projections 913.

Figure 7:
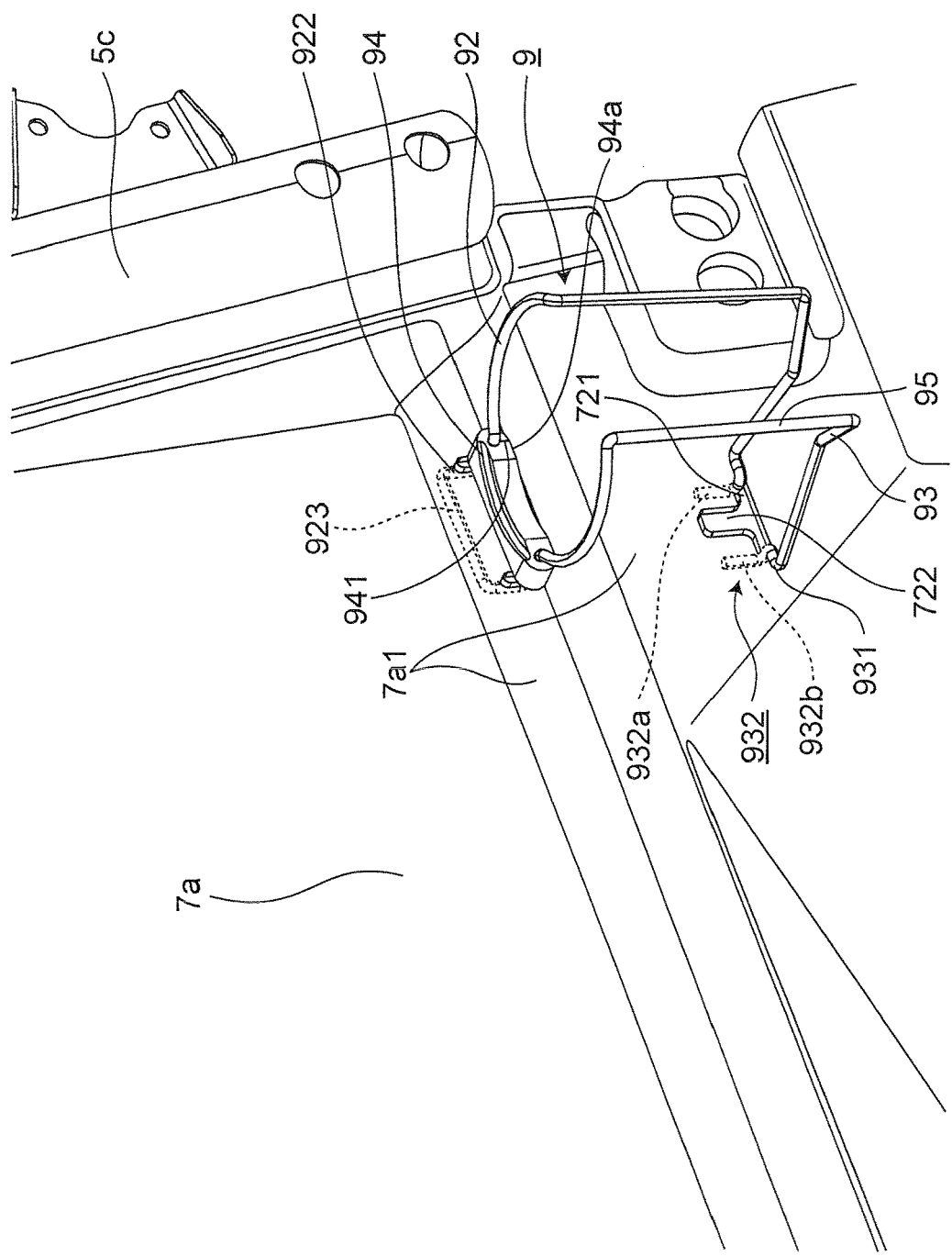
FIG. 7 is a view of a state where the cup is removed from the state shown in FIG. 6.

FIG. 7 is a view of a state where the cup 91 is removed from the state shown in FIG. 6. As shown in FIG. 7, the upper holding portion 92 includes first extending portions 921 extending in the vehicle width direction toward the left rear door 7 and first tip end portions 922 extending upward from ends of the first extending portions 921. The first extending portions 921 and the first tip end portions 922 are paired in the anteroposterior direction, respectively. The upper ends of the first tip end portions 922 are coupled by a coupling portion 923 extending in the anteroposterior direction.

The lower holding portion 93 includes a second extending portion 931 extending in the vehicle width direction toward the left rear door 7 and a second tip end portion 932 extending upward from an end of the second extending portion 931. The second tip end portion 932 includes a first projection 932a and a second projeCtion 932b paired in the anteroposterior direction. The second tip end portion 932 is contractable in anteroposterior distance between the first projection 932a and the second projection 932b.

Figure 8:
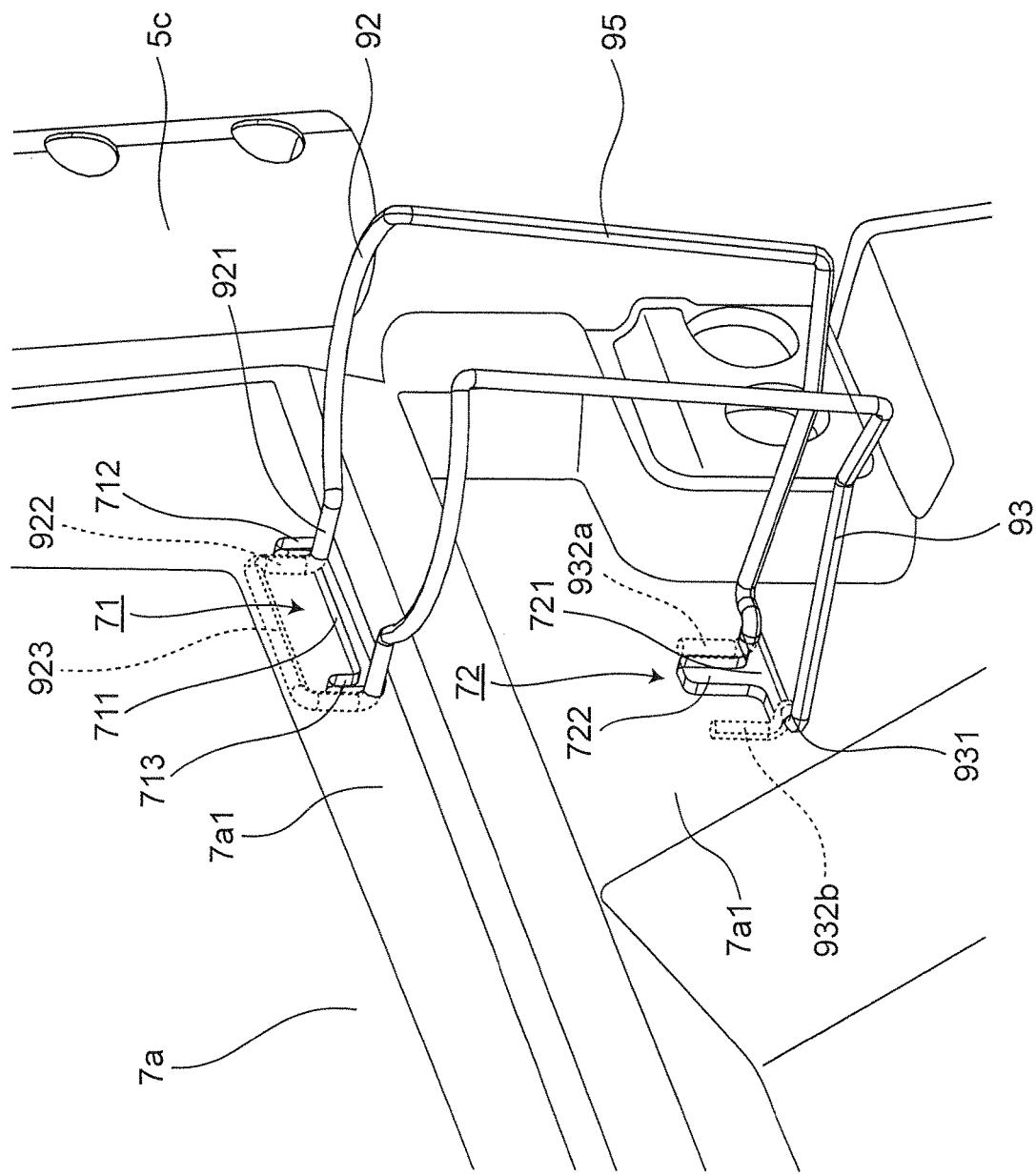
FIG. 8 is a view of a state where an elastic member is removed from the state shown in FIG. 7.

The container holder 9 includes an elastic member 94 that is attached to the first extending portions 921 and is in contact with the side surface of a container received in the container holder 9. FIG. 8 is a view of a state where the elastic member 94 is removed from the state shown in FIG. 7. The elastic member 94 has a lower surface 94a that is provided with a cut off portion 941 extending vertically. The cut off portion 941 is engaged with the first extending portions 921. The elastic member 94 is made of rubber or the like.

The left rear door 7 has a first insertion hole 71 configured to receive the first tip end portions 922 and a second insertion hole 72 configured to receive the second tip end portion 932. The first insertion hole 71 and the second insertion hole 72 are provided in a flat part 7a1 in an inner wall surface 7a of the left rear door 7. The flat part 7a1 has a flat surface substantially perpendicular to the horizontal plane.

The first insertion hole 71 has a first opening 711 extending in the anteroposterior direction, a second opening 712 extending upward from the front end of the first opening 711, and a third opening 713 extending upward from the rear end of the first opening 711. The entire first insertion hole 71 thus has a cornered U shape. The first opening 711 is slightly longer in anteroposterior length than the coupling portion 923. The second opening 712 and the third opening 713 are substantially equal in vertical length and are slightly shorter in vertical length than the first tip end portions 922.

The second insertion hole 72 has a fourth opening 721 extending in the anteroposterior direction and a fifth opening 722 extending upward from the anteroposterior center of the fourth opening 721. The entire second insertion hole 72 thus has a projecting shape. The fifth opening 722 is longer in vertical length than the second tip end portion 932.

The container holder 9 is attached to the first insertion hole 71 and the second insertion hole 72 in the door 7 in accordance with the following processes.

The container holder 9 is attached to the door 7 by initially inserting the first tip end portions 922 to the first insertion hole 71 and subsequently inserting the second tip end portion 932 to the second insertion hole 72.

In order to insert the first tip end portions 922 to the first insertion hole 71, the container holder 9 is initially slanted to horizontally direct the first tip end portions 922 and allow the coupling portion 923 coupling the first tip end portions 922 to pass through the first opening 711. The coupling portion 923 and the first tip end portions 922 are inserted to the first opening 711 in the mentioned order. After the first tip end portions 922 passes through the first opening 711, the container holder 9 is redirected into the state of holding a container so as to vertically direct the first tip end portions 922. The second opening 712 and the third opening 713 are shorter in vertical length than the first tip end portions 922. The first tip end portions 922 and the coupling portion 923 are not disengaged from the first insertion hole 71 while the container holder 9 is directed in the container holding state.

After the coupling portion 923 and the first tip end portions 922 are inserted to the first insertion hole 71, the second tip end portion 932 is inserted to the second insertion hole 72. In order to insert the second tip end portion 932 to the second insertion hole 72, the anteroposterior distance between the first projection 932a and the second projection 932b is initially shortened so as to allow the second tip end portion 932 to pass through the fifth opening 722. After the second tip end portion 932 passes through the fifth opening 722, the anteroposterior distance between the first projection 932a and the second projection 932b is returned to the original length. In this state, the first projection 932a is located at the front end of the fourth opening 721 and the second projection 932b is located at the rear end of the fourth opening 721. Accordingly, the second tip end portion 932 is not disengaged from the second insertion hole 72 unless the anteroposterior distance between the first projection 932a and the second projection 932b is shortened.

The container holder 9 thus configured can achieve the following effects.

(1) The container holder 9 is attached to the door 7, so that a crew seated at a seat can easily pick up a container received in the container holder 9. Furthermore, this configuration provides the container holder 9 that is easily attached to the door 7 of the utility vehicle 1.

(2) The container holder 9 includes the elastic member 94 that is attached to the first extending portions 921 and is in contact with the side surface of a container received in the container holder 9. The elastic member 94 thus improves the container holding property of the container holder 9.

(3) The elastic member 94 is provided with the cut off portion 941 that is engaged with the first extending portions 921. The elastic member 94 can thus be easily attached to the first extending portions 921.

(4) The cut off portion 941 is provided in the lower surface of the elastic member 94. The elastic member 94 can thus be easily attached from above the first extending portions 921.

(5) The container holder 9 includes the first tip end portions 922 inserted to the first insertion hole 71 in the door 7 and the second tip end portion 932 inserted to the second insertion hole 72 in the door 7. In this configuration, the first tip end portions 922 and the second tip end portion 932 are easily inserted to the first insertion hole 71 and the second insertion hole 72, respectively, and are less likely to be disengaged from the first insertion hole 71 and the second insertion hole 72, respectively, in the container holding state. This configuration provides the container holder 9 that is easily attached to the door 7 of the utility vehicle 1 and is less likely to be disengaged from the door 7 in the container holding state (attached state).

(6) The first insertion hole 71 and the second insertion hole 72 are provided in the flat part 7a1 in the inner wall surface of the door 7. The first insertion hole 71 and the second insertion hole 72 can thus be formed easily. The container holder 9 also prevents interference between the door 7 and a container received in the container holder 9 that is attached to the door 7.

(7) The container holder 9 includes the cup 91, so that a drink container can be received in the cup 91. The cup 91 has the projections 913 that prevent the cup 91 from jumping upward from the upper holding portion 92.

[Application of Cups 81 and 91 Also to Front Seat Cup Holder]

Figure 9:
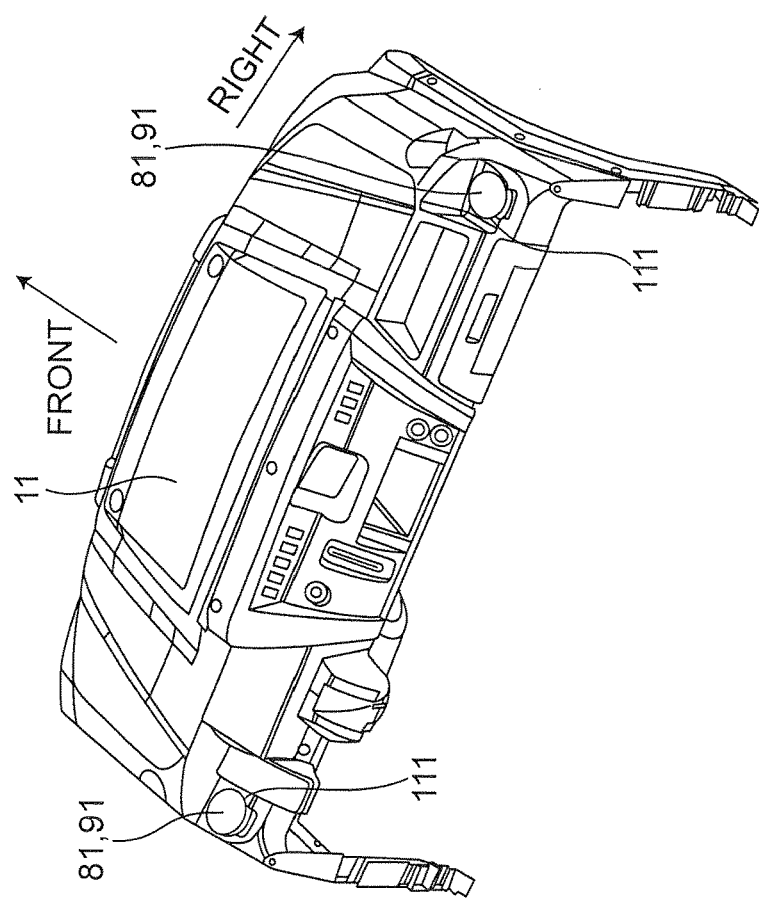
FIG. 9 is an enlarged view of a bonnet shown in FIG. 1.

FIG. 9 is an enlarged view of the bonnet 11 shown in FIG. 1. As shown in FIG. 9, a pair of right and left cup holders 111 for crews seated at the front seat 13 is provided ahead of the front seat 13 and at the rear end of the bonnet 11. The cup 81 and the cup 91 are attachable to the cup holders 111.

Figure 10:
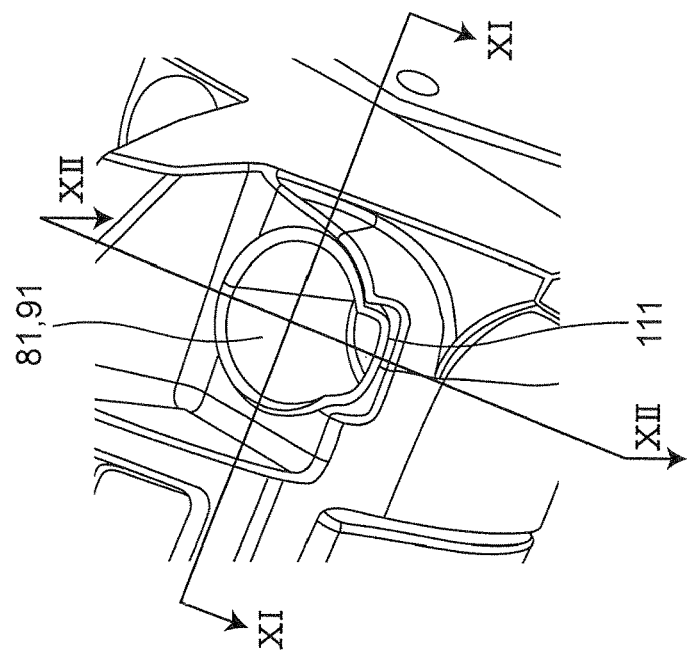
FIG. 10 is an enlarged view of a right cup holder.

FIG. 10 is an enlarged view of the right cup holder 111. FIG. 11 is a sectional view taken along line XI-XI indicated in FIG. 10, and FIG. 12 is a sectional view taken along line XII-XII indicated in FIG. 10. The left cup holder is configured similarly to the right cup holder. The right cup holder 111 is exemplified in the following description. As shown in FIG. 11, the cup holder 111 is provided, at the ends in the vehicle width direction, with engagement portions 112 and 113 that extend substantially downward from the ends in the vehicle width direction. Each of the engagement portions 112 and 113 is located between the upper edge 811 Pr 911 of the cup 81 or 91 and the projection 813 or 913 and is engaged with the projection 813 or 913 to hold the upper edge 811 or 911 from below. Similarly, as shown in FIG. 12, the cup holder 111 is further provided, at the rear end, with an engagement portion 114 that extends substantially downward from one of the ends in the vehicle width direction. The engagement portion 114 is located between the upper edge 811 or 911 of the cup 81 or 91 and the projection 813 or 913 and is engaged with the projection 813 or 913 to hold the upper edge 811 or 911 from below.

The container holders 8 and 9 thus configured can achieve the following effects.

(1) The cup holders 111 for crews seated at the front seat 13 are provided ahead of the front seat 13. The cup holders 111 are each provided with the engagement portions 112 to 114 configured to be engaged with the projections 813 or 913 so as to allow the cup 81 or 91 to be attached to the cup holder 111. The cup 81 of the container holder 8 and the cup 91 of the container holder 9 are thus applicable also to the cup holders 111 for crews seated at the front seat 13.

(2) The engagement portions 112 to 114 are provided at the ends in the vehicle width direction and the rear end of the cup holder 111 that is accordingly engaged with the cup 81 or 91 at the three positions, namely, the right, left, and rear positions. The cup 81 or 91 can thus be held stably.

The container holder 8 according to the embodiment described above is held by the upper lateral member (grip member) 5e and the lower lateral member (backrest member) 5f in the R.O.P.S. 5. The members holding the container holder 8 are not limited to the upper lateral member and the lower lateral member. The container holder 8 can be alternatively held by various members of the vehicle body frame of the utility vehicle 1. In the container holder 8, the support member 82 is preferably disposed between two members in the R.O.P.S. located vertically and extending in the vehicle width direction so as to be held therebetween.

The upper holding portion 92, the lower holding portion 93, and the vertical holding portion 95 are provided integrally in the container holder 9 according to the above embodiment. The upper holding portion 92 and the lower holding portion 93 can be alternatively provided separately from each other.

The present invention can be modified or changed in various manners without departing from the spirit and scope of the present invention recited in the following patent claims.

The invention claimed is:

1. A container holder attached to a utility vehicle, the container holder configured to be attached to a door of the utility vehicle, the container holder comprising:
an upper holding portion configured to hold a side surface of a container and a lower holding portion configured to support a lower surface of the container; wherein
the upper holding portion includes a first extending portion extending in a vehicle width direction toward the door and a first tip end portion extending upward from an end of the first extending portion,
the lower holding portion includes a second extending portion extending in the vehicle width direction toward the door and a second tip end portion extending upward from an end of the second extending portion, and
the door has a first insertion hole configured to receive the first tip end portion and a second insertion hole configured to receive the second tip end portion,
wherein
the first insertion hole has a first opening extending in an anteroposterior direction, a second opening extending upward from a front end of the first opening, and a third opening extending upward from a rear end of the first opening,
the second insertion hole has a fourth opening extending in the anteroposterior direction and a fifth opening extending upward from an anteroposterior center of the fourth opening, the second opening and the third opening are shorter in vertical length than the first tip end portion, the second tip end portion has first and second projections paired in the anteroposterior direction, the fifth opening is longer in vertical length than the second tip end portion, the second tip end portion is configured to be contractable in anteroposterior distance between the first projection and the second projection to pass through the fifth opening, the anteroposterior distance between the first projection and the second projection returns to a length before shrinkage after the second tip end portion passes through the fifth opening, and the first projection is located at a front end of the fourth opening and the second projection is located at a rear end of the fourth opening.

2. The container holder according to claim 1, further comprising:

an elastic member attached to the first extending portion and being in contact with a side surface of a container received in the container holder.

3. The container holder according to claim 2, wherein the elastic member is provided with a cut off portion, and the cut off portion is engaged with the first extending portion.

4. The container holder according to claim 3, wherein the cut off portion is provided in a lower surface of the elastic member.

5. The container holder according to claim 1, wherein the first insertion hole and the second insertion hole are provided in a flat part in an inner wall surface of the door.

* * * * *